Jan. 8, 1952      T. A. HERKENHAM      2,581,485

FISHING PLUG WITH GUARDED HOOK

Filed Dec. 6, 1950

Inventor
Thomas A. Herkenham
by William G. Edwards, Jr.
His Attorney

Patented Jan. 8, 1952

2,581,485

UNITED STATES PATENT OFFICE 2,581,485

FISHING PLUG WITH GUARDED HOOK

Thomas A. Herkenham, Schenectady, N. Y.

Application December 6, 1950; Serial No. 199,481

10 Claims. (Cl. 43—42.36)

My invention relates to fishing lures and particularly to casting lures of the plug type.

In plug casting it is a common practice to employ a lure formed to represent a fish or other water animal and provided with one or more barbed fish hooks usually of the triple hook type. The hooks readily catch on objects with which they come in contact and become snagged thereon. Furthermore, when a fisherman is casting near another person there is danger of accidental snagging and injuring of the other person. Accordingly, it is an object of my invention to provide a plug casting lure having an arrangement for guarding the fish hooks against accidental snagging when the lure is out of the water.

It is another object of my invention to provide a plug casting lure having an improved arrangement for guarding the fish hooks thereon.

It is a further object of my invention to provide a plug casting lure having an improved arrangement for providing an effective guard for the fish hooks when the lure is not in use.

Further objects and advantages of my invention will become apparent as the following description proceeds and the features of novelty which characterize my invention will be pointed out with particularity in the claims annexed to and forming a part of this specification.

In carrying out the objects of my invention I provide a plug type casting lure having an elongated body of insulated material and provided with a longitudinal passage in which is mounted a shaft or bar having a line attaching element at one end and a fish hook attached to the other end. The bar is arranged so that it can move freely in the passage and can draw the shank of the hook into the passage and bring the point or points of the hook against the body of the lure to guard the hooks. A locking arrangement is provided to secure the hook in this guarded position. In order to cast the lure the bar is freed and after reaching the water it falls downward and exposes the hook, the body being weighted to float the hook end down. When the lure is then drawn through the water a gravity actuated lock prevents movement of the bar to draw the hook shank into the lure; the hook is thus maintained in its unguarded position during the retrieving movement of the lure.

Figure 2:
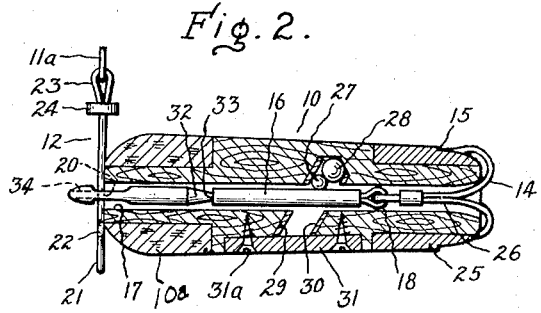
Figure 1:
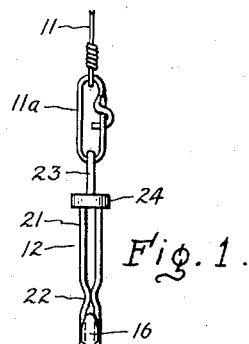
Figure 3:
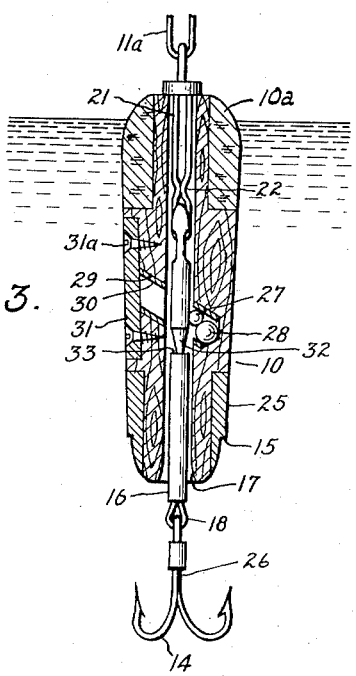
Figure 5:
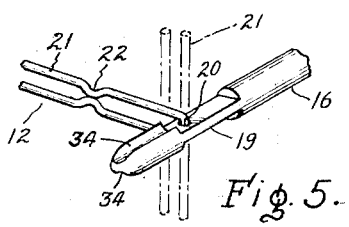
Figure 4:
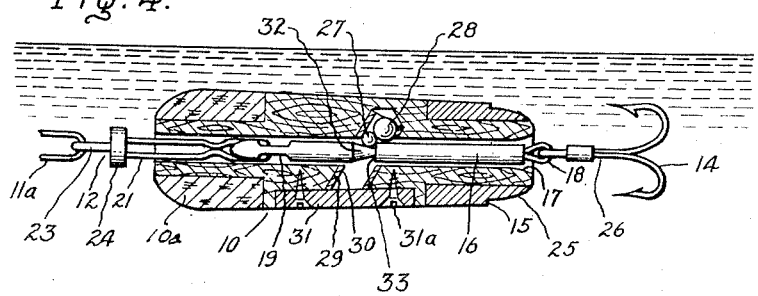
Figure 6:
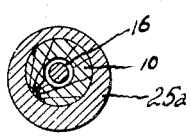

For a better understanding of my invention reference may be had to the accompanying drawing in which Fig. 1 is a view of a fishing plug embodying my invention on a line ready for casting; Fig. 2 is a longitudinal sectional view of the lure with the hook locked in its guarded position; Fig. 3 is a view of the lure floating idly in the water; Fig. 4 is a view of the lure while being drawn through the water; Fig. 5 is an enlarged perspective view of the hook guard lock; and Fig. 6 is a transverse sectional view of a plug embodying my invention provided with a modified form of balance weight.

Referring now to the drawing, the casting plug illustrated in Fig. 1 comprises a buoyant generally cylindrical body 10 arranged to be attached to a casting line 11 by a line attaching element 12, a snap fastener 11a being used to connect the line and element 12. The specific shape or appearance of the plug may be selected in the usual manner in accordance with the use which is to be made of the lure; for purposes of illustration, the plug in the drawing has been shown with a generally cylindrical body tapering slightly away from the line end and with an eye 13 represented thereon. In Fig. 1 a triple pointed fish hook 14 has been shown with its shank drawn into the body 10 so that the points engage the outer surface of the body and are guarded by an annular shoulder 15 so that they will not become snagged on other objects.

The details of construction of the lure will be more clearly apparent from a consideration of Figs. 2, 3, and 4 which show the body 10 in section. In Fig. 2 the hook 14 is locked in its guarded position by the attaching element 12 which is attached to the hook by a longitudinal shaft or bar 16 loosely mounted in a longitudinal passage 17 extending from end to end of the body 10. The bar is provided with a loop 18 at one end to which the hook 14 is attached and has a flattened portion 19 at the other end having a hole 20 through which the element 12 passes. The attaching element 12 comprises an elongated loop 21 of resilient wire having converging bends 22 near its center and a line attaching eye 23 secured to a transverse disk 24 which is welded or otherwise rigidly secured to the resilient wire loop. The wire loop 21 passes through the hole 20 in the bar 16 and as shown in Fig. 2 has been snapped past the bends 22 so that it lies transverse to the plug and locks the hook 14 in its guarded position by preventing movement of the bar 16. In this position the lure may be handled or placed in the tackle box without its becoming snagged on other lures or objects with which it comes in contact.

If now the locking loop 12 is snapped back and pivoted into alinement with the bar 16, the bar is free to move through the passage 17 until the disk 24 strikes the body of the lure at the end of the passage. This is the normal position of the bar when the lure is allowed to float idly in the water as shown in Fig. 3. In order to make the lure float in this manner in an upright position a suitable weight or ballast element 25 is mounted at the hook end of the body 10. If the line is drawn upwardly from the position in Fig. 3 the bar 16 will move through the passage and the hook will again be moved to its guarded position with its shank indicated at 26 lying within the passage 17.

In order to retain the hook 14 in its position outside the passage I provide a gravity actuated locking device comprising small balls or weighted elements 27 and 28 retained in a transverse passage 29 in the body 10 and communicating with the passage 17. The ball 28 is larger than the ball 27 and the ball 27 cannot be interchanged with the ball 28 in the recess 29 there being insufficient room for it to pass around the ball 28. The passage 29 is preferably formed or drilled at an oblique angle to the passage 17 so that it slopes downwardly toward the hook and outwardly in the position of Fig. 3. The passage 29 may be drilled from the opposite side of the body as indicated so that bar 16 retains the balls 27 and 28 in a recess from which they cannot be moved until the bar has been withdrawn. The drilled passage may be lined with a suitable plastic or metal sleeve 30 to resist wear and minimize friction between the balls and the walls of the passage. The purpose of the transverse passage and the balls 27 and 28 is to provide a lock to prevent retraction of the hook when the lure is being drawn through the water on retrieving the cast.

When the plug has been cast it lands in the water and the hook falls out or is carried out by its momentum provided the lure strikes the water hook first. Thereafter when the line is tightened and drawn through the water the plug assumes a horizontal position as indicated in Fig. 4. The balls 27 and 28 will always be on the top side of the bar 16 because the body 10 is provided with sufficient counterweight on the side opposite the closed recess. In the construction illustrated a ballast weight 31 is secured along the bottom side of the lure by wood screws 31a and closes the lateral drill hole or passage 29. As the plug assumes its horizontal position the ball 27 falls against the bar 16 and is held there by its weight and that of the ball 28 as well. The bar 16 moves slightly away from the hook end of the passage until a cone shaped portion 32 permits the ball 27 to move into the passage 17 and to be locked immediately thereafter between the walls of the passage and an annular shoulder or stop 33 at the apex of the cone portion 32. This locks the shank of the hook outside the plug body and leaves the hook in its free or ready position.

Should a fish then strike and be hooked the line tension is transmitted directly through the bar, the body 10 forming no part of the tackle under strain.

In the event a fish is not hooked, the plug will be brought toward the fisherman and finally will come upright whereupon any slight action of the water on tending to produce a bobbing movement of the buoyant body 10 will release the ball 27 whereupon the hook will be drawn into its guarded position. In this connection it is to be noted that the cone-shaped surface 32 tends to force the ball 27 out of engagement with the wall of the passage whenever there is a force tending to move the bar 16 toward the hook end of the lure. The release can, of course, be effected by drawing the plug out of the water and then dipping back into the water to produce a positive bobbing action and release the ball 27.

The front or line end of the plug body as indicated at 10a has been shown as constructed of cork whereas the main body 10 has been shown as constructed of wood. This illustrates one method for securing the required balance of the buoyant and weighted portions of the plug. It is obvious that any suitable arrangement may be employed to secure the required balance so that the plug will float idly as shown in Fig. 3 but will assume the position of Fig. 4 when drawn through the water.

The enlarged view of Fig. 5 shows clearly how the resilient loop 21 may be moved out of alinement from its position in alinement with the bar 16 and may be slid through the hole 20 to the dotted line position wherein it may be slid to the position of Fig. 2 the bends 22 serving to lock it in this position. When the loop 21 is in alinement with the bar 16 it is resiliently locked in position by notches or grooves 34 in the bar in alinement with the hole 20. Thus it is held in alinement to afford unitary or bodily longitudinal movement with the bar.

Should it be desired both the balancing weights may be combined in a single member as shown in Fig. 6. Here a weight 25a corresponding to the weight 25 is shaped to provide a greater weight on its side at the bottom of the plug. Thus the additional weight 31 is not necessary and the recess 27 may be closed by any suitable cover or stopper (not shown) to secure the desired appearance but which is not required to provide added weight.

From the foregoing it is readily apparent that I have provided a casting lure incorporating a simple and effective arrangement for retaining the barbed hooks in a guarded position except when the lure is being drawn through the water on retrieving the cast. Thus the likelihood of snagging the lure on other objects is effectively minimized and increased safety is provided.

Although I have illustrated and described specific embodiments of my invention other modifications will readily occur to those skilled in the art. I do not, therefore, desire my invention to be limited to the details of construction shown and I intend by the appended claims to cover all modifications which fall within the spirit and scope of my invention.

What I claim as new and desire to secure by Letters Patent of the United States is:

1. A fishing lure of the plug type comprising an elongated body of buoyant material having a passage extending longitudinally therethrough, a bar disposed in said passage and having a line attaching element at one end, a fish hook attached to the other end of said bar and having a shank movable with said bar into said passage where said hook is guarded by said body, means for biasing said body to float normally with said hook at the lowermost end thereof and to float with a predetermined side downward when said lure is drawn horizontally through the water, and a gravity biased element mounted in said body on the side of said passage remote from said predetermined side and positioned to engage said bar and to lock it against movement through said passage when said lure is drawn through the water with said hook outside said body, whereby said hook moves to its position outside said body when said lure is idle in the water and is locked outside said body when said lure is being drawn through the water.

2. A fishing lure of the plug type comprising an elongated body of buoyant material having a passage extending longitudinally therethrough, a bar disposed in said passage and having a line attaching element at one end, a fish hook attached to the other end of said bar and having a shank movable with said bar into said passage where said hook is guarded by said body, means for biasing said body to float normally with said hook at the lowermost end thereof and to float with a predetermined side downward when said lure is drawn horizontally through the water, said body having a recess opening into said passage on the side remote from said predetermined side, said bar having a shoulder positioned to be adjacent said recess when said bar is in its position with said hook extended, and a gravity biased element in said recess shaped to engage said shoulder and lock said bar in position in said passage when said bar is urged forward in said passage by drawing said lure horizontally through the water, whereby said hook moves to its position outside said body when said lure is idle in the water and is locked outside said body when said lure is being drawn through the water.

3. A fishing lure of the plug type comprising an elongated body of buoyant material having a passage extending longitudinally therethrough, a bar disposed in said passage and having a line attaching element at one end, a fish hook attached to the other end of said bar and having a shank movable with said bar into said passage where said hook is guarded by said body, means for biasing said body to float normally with said hook at the lowermost end thereof and to float with a predetermined side downward when said lure is drawn horizontally through the water, said body having a lateral passage therein opening into said longitudinal passage on the side remote from said predetermined side and sloping toward said passage and away from said hook, and a locking element freely movable in said lateral passage whereby it is biased by gravity toward said bar in the normal horizontal position of said lure and away from said body when said lure is upright with its hook end down, said bar having a shoulder positioned to lie adjacent said lateral passage and engage said locking element when said hook is extended and prevent movement of said shank into said body, whereby said hook moves to its position outside said body when said lure is idle in the water and is locked outside said body when said lure is being drawn through the water.

4. A fishing lure of the plug type comprising an elongated body of buoyant material having a passage extending longitudinally therethrough, a bar disposed in said passage and having a line attaching element at one end, a fish hook attached to the other end of said bar and having a shank movable with said bar into said passage where said hook is guarded by said body, means for biasing said body to float normally with said hook at the lowermost end thereof and to float with a predetermined side downward when said lure is drawn horizontally through the water, said bar having a surface thereon inclined inwardly toward said hook and a shoulder adjacent said surface at its end toward said hook, said body having a lateral recess communicating with said passage at a position adjacent said surface and shoulder when said hook shank is outside said body, and a locking element freely mounted in said recess and in the horizontal position of said lure biased by gravity to engage said shoulder and prevent movement of said shank into said body, said inclined surface acting to urge said element back into said recess upon movement of said bar through said passage in the direction of said hook, whereby said hook moves to its position outside said body when said lure is idle in the water and is locked outside said body when said lure is being drawn through the water.

5. A fishing lure of the plug type comprising an elongated body of buoyant material having a passage extending longitudinally therethrough, a bar disposed in said passage and having a line attaching element at one end, a fish hook attached to the other end of said bar and having a shank movable with said bar into said passage where said hook is guarded by said body, means for biasing said body to float normally with said hook at the lowermost end thereof and to float with a predetermined side downward when said lure is drawn horizontally through the water, said bar having a cone shaped portion pointing toward said hook and an annular shoulder adjacent the apex of said cone portion, said body having a lateral passage communicating with said longitudinal passage adjacent the position of said cone portion when said bar is in its extended position with said shank outside said passage, said lateral passage sloping inwardly toward said longitudinal passage and away from said hook, and a ball freely movable in said lateral passage and arranged to fall by gravity and engage said shoulder and said body and lock said bar to retain said shank outside said longitudinal passage when said lure is being drawn through the water, whereby said hook moves to its position outside said body when said lure is idle in the water and is locked outside said body when said lure is being drawn through the water.

6. A fishing lure of the plug type comprising an elongated body of buoyant material having a passage extending longitudinally therethrough, a bar disposed in said passage and having a line attaching element at one end, a fish hook attached to the other end of said bar and having a shank movable with said bar into said passage where said hook is guarded by said body, means for biasing said body to float normally with said hook at the lowermost end thereof and to float with a predetermined side downward when said lure is drawn horizontally through the water, said bar having a cone shaped portion pointing toward said hook and an annular shoulder adjacent the apex of said cone portion, said body having a lateral passage communicating with said longitudinal passage adjacent the position of said cone portion when said bar is in its extended position with said shank outside said passage, said lateral passage sloping inwardly toward said longitudinal passage and away from said hook, and a ball freely movable in said lateral passage and arranged to fall by gravity and engage said shoulder and said body and lock said bar to retain said shank outside said longitudinal passage when said lure is being drawn through the water, whereby said hook moves to its position outside said body when said lure is idle in the water and is locked outside said body when said lure is being drawn through the water, and a second and larger ball freely mounted in said lateral passage on the outer side of said first mentioned ball for providing increased force urging said first ball into its locking position.

7. A fishing lure of the plug type comprising an elongated body of buoyant material having a passage extending longitudinally therethrough, a bar disposed in said passage and having a line attaching element at one end, and a fish hook attached to the other end of said bar and having a shank movable with said bar into said passage where said hook is guarded by said body, said line attaching element including a resilient looped member pivotally and slidably attached to said bar, the pivot of said member on said bar being at the end of said lure remote from said hook when said shank lies within said passage and said hook is in its guarded position, said member in such position being arranged to pivot until normal to said bar and then being slidable across the end of said lure to lock said hook in its guarded position.

8. A fishing lure of the plug type comprising an elongated body of buoyant material having a passage extending longitudinally therethrough, a bar disposed in said passage and having a line attaching element at one end, and a fish hook attached to the other end of said bar and having a shank movable with said bar into said passage where said hook is guarded by said body, said line attaching element including a resilient looped member pivotally and slidably attached to said bar, the pivot of said member on said bar being at the end of said lure remote from said hook when said shank lies within said passage and said hook is in its guarded position, said member is such position being arranged to pivot until normal to said bar and then being slidable across the end of said lure to lock said hook in its guarded position, said bar having a notch in alinement with said pivot whereby said member when in alinement with said bar is locked in position and constitutes a rigid extension of said bar.

9. A fishing lure of the plug type comprising an elongated body of buoyant material having a passage extending longitudinally therethrough, a bar disposed in said passage and having a line attaching element at one end, and a fish hook attached to the other end of said bar and having a shank movable with said bar into said passage where said hook is guarded by said body, said bar having a flattened portion adjacent the line end thereof and having a hole therethrough and a longitudinal grooved portion between said flattened portion and the line end thereof, the groove being in alinement with the hole in the flattened portion, and said line attaching element comprising an elongated resilient looped member pivotally and slidably mounted in the hole in said flattened portion, and arranged to be engaged in the groove and movable between a first position locked in said groove and in alinement with said bar and a second position transverse to said bar and in engagement with the end of said lure on either side of said bar to lock said hook in its guarded position.

10. A fishing lure of the plug type comprising an elongated body of buoyant material having a passage extending longitudinally therethrough, a bar disposed in said passage and having a line attaching element at one end, a fish hook attached to the other end of said bar and having a shank movable with said bar into said passage where said hook is guarded by said body, means for biasing said body to float in water normally with said hook at the lowermost end thereof and to float with a predetermined side downward when said lure is drawn horizontally through the water, said body having a lateral passage extending from said predetermined side and intersecting said longitudinal passage, and a locking element loosely mounted in said lateral passage on the side of said longitudinal passage remote from said predetermined side, said element being retained in said portion of said lateral passage by said bar, said bar having a shoulder positioned to lie adjacent said lateral passage in its position with said hook extended, said element falling against said bar to engage said shoulder and lock said bar in position when said bar is urged forward in said passage by the drawing of said bar forward relative to said body.

THOMAS A. HERKENHAM.

REFERENCES CITED

The following references are of record in the file of this patent:

UNITED STATES PATENTS

| Number | Name | Date |
|---|---|---|
| 1,318,073 | Gottschalk | Oct. 7, 1919 |
| 2,288,009 | Matasy et al. | June 30, 1942 |
| 2,470,861 | Prentice | May 24, 1949 |